(12) United States Patent
Guimaraes et al.

(10) Patent No.: US 6,864,915 B1
(45) Date of Patent: Mar. 8, 2005

(54) METHOD AND APPARATUS FOR PRODUCTION OF AN IMAGE CAPTURED BY AN ELECTRONIC MOTION CAMERA/SENSOR THAT EMULATES THE ATTRIBUTES/EXPOSURE CONTENT PRODUCED BY A MOTION CAMERA FILM SYSTEM

(75) Inventors: Marcelo de C. Guimaraes, Rochester, NY (US); John C. Brewer, Rochester, NY (US); Nestor M. Rodriquez, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 854 days.

(21) Appl. No.: 09/697,800

(22) Filed: Oct. 27, 2000

(51) Int. Cl.[7] .......................... H04N 5/228; H04N 9/73; H04N 3/36; H04N 1/46
(52) U.S. Cl. .................. 348/222.1; 348/223.1; 348/97; 358/527; 358/523
(58) Field of Search .......................... 348/222.1, 223.1, 348/576, 655, 97, 96, 272, 273, 187, 188; 352/6, 12, 31; 358/527; 382/162, 167

(56) References Cited

U.S. PATENT DOCUMENTS

| 4,771,342 | A | | 9/1988 | Beesley ........................ 358/335 |
|---|---|---|---|---|
| 4,935,816 | A | | 6/1990 | Faber ............................ 358/160 |
| 5,001,663 | A | * | 3/1991 | Parulski et al. ............... 708/607 |
| 5,140,414 | A | | 8/1992 | Mowry .......................... 358/81 |
| 5,335,013 | A | * | 8/1994 | Faber ............................ 348/104 |
| 5,374,954 | A | | 12/1994 | Mowry ......................... 348/121 |
| 5,406,326 | A | | 4/1995 | Mowry ......................... 348/104 |
| 5,457,491 | A | | 10/1995 | Mowry ......................... 348/104 |
| 5,475,425 | A | | 12/1995 | Przyborski et al. .......... 348/239 |
| 5,475,506 | A | * | 12/1995 | Kwon et al. .................. 358/500 |
| 5,582,961 | A | * | 12/1996 | Giorgianni et al. .......... 430/508 |
| 5,668,596 | A | | 9/1997 | Vogel ........................... 348/222 |
| 5,687,011 | A | * | 11/1997 | Mowry ......................... 358/527 |
| 5,805,213 | A | * | 9/1998 | Spaulding et al. ......... 348/222.1 |
| 5,917,987 | A | * | 6/1999 | Neyman ....................... 386/42 |
| 6,100,928 | A | * | 8/2000 | Hata .......................... 348/229.1 |
| 6,122,006 | A | * | 9/2000 | Bogdanowicz et al. ... 348/222.1 |
| 6,269,180 | B1 | * | 7/2001 | Sevigny ....................... 382/162 |

* cited by examiner

*Primary Examiner*—Andrew Christensen
*Assistant Examiner*—Lin Ye
(74) *Attorney, Agent, or Firm*—Stephen H. Shaw

(57) ABSTRACT

An electronically originated image is converted into a modified electronic image simulating an image originated from a film system and converted into an electronically displayed image. The technique employed is based on a set of electronic camera system spectral product curves that are substantially approximated by a linear combination of a set of spectral product curves characteristic of the film system. An image is captured having red, green and blue exposure signals resulting from these electronic camera system spectral product curves, and the red, green and blue exposure signals are then converted into a modified electronic image simulating an image originated from a film system and converted into an electronically displayed image. Because of the linear approximation between the spectral product curves, the conversion step can be performed by a matrixing operation.

23 Claims, 4 Drawing Sheets

METHOD AND APPARATUS FOR PRODUCTION OF AN IMAGE CAPTURED BY AN ELECTRONIC MOTION CAMERA/SENSOR THAT EMULATES THE ATTRIBUTES/EXPOSURE CONTENT PRODUCED BY A MOTION CAMERA FILM SYSTEM

FIELD OF THE INVENTION

The invention relates generally to the field of motion picture capture, image processing and display. More specifically, the invention relates to the generation of electronically originated images that simulate images originated on motion picture film and transferred to video on a telecine machine, for display on a broadcast monitor.

BACKGROUND OF THE INVENTION

Cinematographers and directors of photography are very concerned about keeping and maintaining, for certain scene sequences, consistency and uniformity in the reproduction of the main subject. This is particularly important when reproducing flesh tones. Also, on many occasions, cinematographers want to apply a special "look" to a given scene, and they must be able to adjust the lighting set-up of a scene such that it is recorded on a film with that particular "look". Independently of what "look" is intended for a scene, it is just as important to predict how film will "see" that scene. In order to achieve such results, cinematographers use devices called exposure (light, spot) meters, which exist in two kinds: incident light meters and reflected light meters. An incident light meter is placed at the position to be occupied by the principal subject and measures the light coming from all available sources at the set. As the name suggests, it measures how much light is incident on the subject. Reflected light meters, on the other hand, are placed at the position to be occupied by the camera and measure the fraction of the light falling on the subject that reaches the camera. Both types of meters come in a variety of designs that account for different lighting conditions by taking advantage of different light collecting geometries.

Moreover, reflected light meters can be of two basic kinds: one kind measures the average brightness of a scene and another kind, the spot meter, measures the brightness of a specific area of the scene. The averaging meter is only recommendable for certain indoor scenes, particularly cases where the discrepancy between the background and foreground illumination is not too large. Spot meters represent a more sophisticated type of meter. Their usage consists of finding a small area in the scene that can be used as a good representative of the exposure of the whole scene and then measuring that specific area with a test-gray-card of known reflectance. The choice of the test area is heavily dependent on the cinematographer's judgment and it becomes a non-trivial task for scenes that place the principal subject, for example, on a very bright background. In fact, independently of what type of light meter is chosen, the process of determining the correctness of the exposure for a scene as a whole can never be done solely by the numbers obtained from the meters. This process also relies heavily on the cinematographer's experience. The cinematographer's knowledge of the film stock used to capture the scenes (and the correspondent "film look" for that stock), in conjunction with light meter measurements, will guide the decision on whether to keep the set as it is, change the backlighting, include some side-lighting or any other necessary modification. In general, such decisions are made with a certain "feel" in mind for each scene.

With the aid of the meters, the cinematographer attempts to match areas of the scene with the correspondent regions of the film dynamic range, once a point of normal exposure has been established. The dynamic range of a film determines what is the maximum luminance ratio (lightest area to darkest area) in a scene that the film can reproduce well. In the motion picture industry, a widely used method to verify the exposure constancy and uniformity of a scene, after all adjustments are made by the cinematographer, is the telecine transfer. This method consists of capturing the scene onto film, processing the film and scanning the processed film in a telecine. The telecine is a machine that transfers the information contained in the film to a video format, besides allowing an operator (colorist) to perform, as needed, some artistic changes to the scene content. Also, images created from a telecine scanner (of scenes originally captured onto film) are capable of providing observers viewing those images with the sensation that the entire range of the film's color reproduction is kept, despite the fact that color film systems can reproduce significantly more color hues and saturations and gray tonalities than video systems. The result of this telecine transfer process is known to those skilled in the art as video "dailies". An acceptable scene reproduction is obtained from dailies created on a trial-and-error basis, which is generally time-consuming. In case the cinematographer is not pleased with the scene look on the daily, the whole process is then repeated, starting with new adjustments and ending with another telecine transfer, until the desired look is obtained. There are, however, certain drawbacks to this process.

Besides being time consuming, this is also a relatively expensive process. Also, the telecine transfer method typically does not offer a quantitative assessment of the film system exposure information.

The difficulties and high costs associated with telecine transfers, along with the restrictions and limitations of light meters, highlights the need for a device that could provide inexpensive, instant and accurate feedback concerning the cinematographer's predictions and adjustments for the lighting conditions of any scene. The current art provides "video taps", usually associated with a film camera, that inadequately address this problem. A video tap is a device that uses one or more charge-coupled-device (CCD) sensors to capture a fraction of the light reflected from the scene and later transforms that light into an electronic signal, or a number of signals, that define an image to be displayed on a monitor. After light reflected from the scene crosses the optical path of a tap, it encounters the CCD sensors, which can be simplistically described as an array of 380,000 or more opto-electrical sensing cells, and an electrical signal is generated. After going through pre-amplifiers and amplifiers, the signals from the red, green and blue channels are converted into digital signals by an analog-to-digital (A/D) converter and later are processed digitally. After processing, the signals are sent to a display device. The viewed image, however, does not necessarily reflect the exposures resultant on a film of interest, nor the appearance the scene would have after being recorded on film, processed and subsequently telecine transferred.

Typically, the problem is that an electronic image capture device, e.g., a CCD, does not "see" light in the same way that a conventional (film) system does. Moreover, in most cases, electronic camera system spectral product curves of a CCD sensor cannot be described as linear combinations of film system spectral product curves. This means that a color correction matrix (or, for that matter, any combination of matrices and 1-D look-up-tables (LUT)) cannot be obtained that will provide a perfect match between a set of CCD exposures and a set of film system exposures, when applied to one of the sets. Only an approximation can be obtained. Therefore, in the case of an electronic camera system and a conventional motion picture system, a perfect match cannot be obtained by the current state of image processing, using techniques such as matrices and LUTs. Consequently, in general, video taps yield errors in both color and tone reproduction of scenes.

A variety of methods can be found in the current art that attempt to emulate the look of a scene captured on film and transferred to video format by a telecine. For instance, U.S. Pat. No. 5,374,954, "Video System for Producing Video Image Simulating the Appearance of Motion Picture or Other Photographic Film", describes a method in which a look-up table is responsible for reassigning (digitally) the color and tone-scale components of each pixel within the image originated on video. Assuming that a certain film stock is to be selected as the original image storing medium, the goal of the method is to generate an approximation between the content of each pixel and its correspondent image on the broadcast display of the transferred, processed film. As part of the method, several diagnostic charts are shot under controlled, even illumination conditions, using several different illuminants, on both film and video. Data measured from those tests allows for the construction of the look-up tables. One drawback of the method is that large look-up tables tend to require powerful host computers with boards capable of handling significant volumes of image processing, which implies high costs for the system. In addition, as explained above, this method provides only an approximation, and not a match, between the modified video look and the telecine-transferred film.

A more unorthodox method of correction is presented in U.S. Pat. No. 5,475,425, "Apparatus and Method for Creating Video Outputs that Emulate the Look of Motion Picture Film". The method can be summarized as follows: the scan rate of the CCD sensors in the video camera is increased in order for it to output non-interlaced video images. This scan rate is analogous to the capture frame rate of a conventional motion picture camera. The resulting image is then converted from the analog to the video domain by an analog-to-digital (A/D) converter. A two-dimensional pattern of electronic artifacts is added to the signal with the objective of simulating film grain properties. Finally, the signal is converted back to the analog domain by a digital-to-analog converter (D/A) and displayed on an output device, such as a computer monitor. The apparatus does not offer a direct method of correction for color and tone scale reproduction of the video signal and, once again, a relatively costly approximation of the telecine-transferred film is the core of what is provided.

It is also of interest to use a video tap system for matte photography applications, i.e. green screen and especially blue screen. When special effects are created with the aid of matte photography techniques, it becomes very important to illuminate the blue screen (or green screen) properly, in order to distinguish it from the main subject during post-production. For better results, individual illumination set-ups are created for the main subject and the blue screen. A typical light meter cannot readily predict the blue exposure content of a blue screen. The reason for this is that the response curve of a typical light meter is similar to the V($\lambda$) curve (spectral luminous efficiency), and it is not intended to meter high chroma blue materials for blue exposure. Therefore, light meters are not efficient tools in determining differences between levels of blue exposure. Cinematographers are forced to rely on a collection of rules of thumb or laborious iterative procedures in order to estimate the correctness of the exposure of a blue screen.

In summary, what has been shown in the current art demonstrates the difficulties involved in predicting how a scene will be reproduced after it is captured on film and subsequently telecine-transferred. It has also been demonstrated that "seeing" a scene in the same way that film does is not an easy task. In addition, none of the examples of current art presented offered any information regarding the individual exposure content for each of the red, green and blue channels. What is needed is a particular design of the system spectral curves that would allow a solid assessment of how a scene will be reproduced after it is captured on film and subsequently telecine-transferred, and additionally a solid assessment of the exposure content differences between the red, green and blue channels. In the latter case, this would allow a solid assessment of the exposure content differences between blue objects on the foreground and the blue screen, which enables the creation of a correct illumination set-up for both the foreground subject and the blue screen.

SUMMARY OF THE INVENTION

The present invention is directed to overcoming one or more of the problems set forth above. Briefly summarized, according to one aspect of the present invention, a method for converting an electronically originated image into a modified electronic image simulating an image originated from a film system and converted into an electronically displayed image is based on a set of electronic camera system spectral product curves that are substantially approximated by a linear combination of a set of spectral product curves characteristic of the film system. An image is captured having red, green and blue exposure signals resulting from the electronic camera system spectral product curves, and the red, green and blue exposure signals are then converted into a modified electronic image simulating an image originated from a film system and converted into an electronically displayed image. Because of the linear approximation between the spectral product curves, the conversion step is adequately performed by a matrixing operation.

The present invention relates broadly to the field of motion picture capture, image processing and display. A key element of the invention comprises an electronic image capture system possessing spectral product curves that can be well approximated as a linear combination of conventional motion picture camera and film system spectral product curves. By satisfying this condition, the invention is capable of "seeing" a scene in the same way that traditional motion picture film does, since exposure sets yielded from the invention and from film can be well matched by a matrix operation. After this matrix is applied to the exposure signals, which are output from the set of CCD sensors in the electronic camera, the resulting signals will represent film system exposure information more accurately.

Two basic functionalities are provided, as follows: the first is the aforementioned capability of producing an output image which matches the reproduction of a scene captured onto a motion picture film, telecine-transferred to video format and broadcast displayed. This result is achieved without the major drawbacks of known practices, which provide at most, only crude approximations between video system scene reproductions and traditional system scene reproductions. The second functionality is the capability of "seeing" the red, green and blue exposure content of a scene in the same way that a motion picture camera and film system does. This enables the user of the invention to develop the correct lighting set-up for a scene, in order to obtain the desired exposure conditions for that scene before it is actually captured onto film. If operated in this mode, the invention performs the task of a spatial light meter that senses light in the same manner that a conventional capture system does.

These and other aspects, objects, features and advantages of the present invention will be more clearly understood and appreciated from a review of the following detailed description of the preferred embodiments and appended claims, and by reference to the accompanying drawings.

Advantageous Effect of the Invention

The present invention has the advantage that it can produce a much more accurate emulation of the broadcast display of a telecine-transferred motion picture film than what is provided by current art. It is also capable of acting as a spatial light meter and providing accurate scene exposure content according to how film systems "see" light, which is a non-existing feature in current art. These two features combined are of great value to a cinematographer or anyone responsible for assuring a "correct look" for a motion picture, for these features will reduce the need for the time-consuming and costly trial-and-error processes existent in current art. Three extra advantages should be mentioned, as follows:

1. The use of the system eliminates the need for transferring film into video for non-linear editing or video dailies.
2. The system allows the user to pre-visualize the telecine-look of a scene, which can be useful for purposes other than video dailies.
3. By using the scene exposure content display function in the system, one can quantify the exposure of green and blue screens, commonly used in special effects photography.

DETAILED DESCRIPTION OF THE INVENTION

Because video and motion picture imaging devices and processing techniques are well known, the present description will be directed in particular to elements forming part of, or cooperating more directly with, method and apparatus in accordance with the present invention. Elements not specifically shown or described herein may be selected from those known in the art. Certain aspects of the embodiments to be described may be provided in software. Given the following materials, software not specifically shown, described or suggested herein that is useful for implementation of the invention is conventional and within the ordinary skill in such arts.

Figure 1:
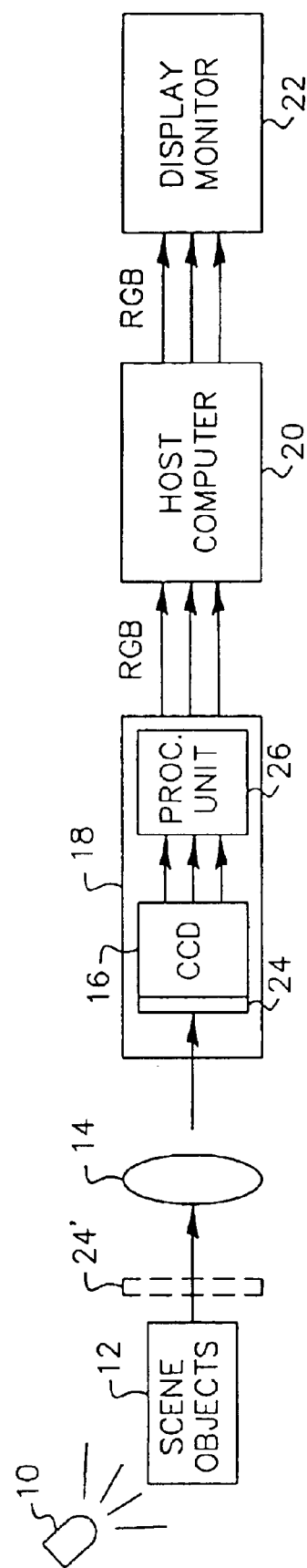
FIG. 1 illustrates the principal elements of the electronic motion picture system described by the invention.

The invention comprises an electronic imaging system for capture, processing and display of image(s), where the system is capable of "seeing" a scene in the same way that traditional motion picture film system does. The structural block diagram for a preferred embodiment of the invention is shown in FIG. 1. Light from a light source 10, which may natural or artificial, is reflected from objects 12 in a scene and passes through an optical section 14, which may include a lens, or a set of lenses, and/or a beam splitter, whereupon the reflected light is captured by one or a set of optically filtered charge-coupled-device (CCD) sensors 16. The sensor(s) 16 reside in an electronic camera 18 which operates at a certain frame rate. After capture, the CCD sensor(s) 16 output a set of three analog signals (corresponding to R, G, B scene color/exposure content) which can be processed digitally in the electronic camera 18 and sent to a host computer 20. A sequence of signal processing operations is applied to the R, G, B signals, which are then converted back to analog format and the resulting image is displayed on a display monitor 22.

In a key element of the invention, the electronic motion camera 18 utilizes the charge-coupled-device (CCD) sensor 16, or a set of some number of CCD sensors, with a particular set of spectral product curves that can be described as a linear combination of the spectral product curves of a motion picture film system. In the preferred embodiment, since the available CCD sensors do not usually possess these characteristics, the CCD sensor 16 is optically filtered with a filter (or a set of filters) 24 having a spectral transmittance curve that, together with the spectral response of the CCD sensor 16 and any other elements in the optical path, provides the aforementioned linear relationship with the system spectral product curves of a motion picture film system or satisfies the criteria given by the two parameters defined in relation to Equations (5) and (6) and specified thereafter. The filter (or set of filters) 24 could be, as shown in FIG. 1, attached to the CCD sensor as a color filter array with the requisite spectral product curves; alternatively, the filter(s) could be a separate optical filter(s) 24' (shown in broken line in FIG. 1) positioned in front of, or within, the optical section 14. The product of the spectral sensitivity curves of the CCD sensor 16 and the optical filter 24 (or 24') and any other elements in the optical path comprise the electronic system spectral product curves of the electronic camera 18, balanced for a given illuminant. Under this condition, it is possible to create a correction matrix such that its elements precisely describe a linear relationship between the electronic camera system spectral product curves and the film system spectral product curves. After this matrix is applied in an image-processing unit to the signals output by the set of CCD sensors 16 in the digital camera 18, the resulting signals will carry accurate film system exposure information.

Accordingly, the digital camera 18 includes an image-processing unit 26 that is responsible for performing real-time signal processing, at some given frame rate, based on matrix operations. The main functions performed by the image-processing unit in the camera include signal gain, determination of a triplet of code values (R, G, B) correspondent to a scene-normal-exposure and a composite matrix operation that relates CCD exposures to film system exposures and to the color matching functions of the output display device 22. Other image processing functions, such as output display gamma correction, are performed in the host computer 20, where the reproduced image is processed for display. (Alternatively, the matrix operations may be applied to the signals in an image processing unit resident in the host computer 20. The host computer 20 may be a personal computer or workstation available to the camera operator, or the host computer may a remote computer accessible over a network, such as the internet. In the latter case, the matrix operations may be performed on a server, which is accessed by the operator over the network connection.)

In order to facilitate an understanding of the invention, it is helpful to review the role of matrix operations in the correction of exposure values. Computations of exposure values, from any object, depend on four factors: the spectral reflectance of the object 12 (Reflec($\lambda$)), the power distribution of the illuminant 10 used (Illum($\lambda$)), the spectral sensitivity curves of the detector(s) 16 capturing the scene (Sensi($\lambda$)), and the set 14 of optical elements used in the capture device (Optics($\lambda$)). For the present invention, Optics ($\lambda$) is defined as the set of all elements present between and including the film camera "taking" lens and the CCD sensor(s). Exposure values are calculated according to the following equations:

$$R = \int_{\lambda-visual} Sensi_{red}(\lambda) \cdot Illum(\lambda) \cdot Optics(\lambda) \cdot Reflec(\lambda) d\lambda \quad \text{(Eq. 1a,1b,1c)}$$

$$G = \int_{\lambda-visual} Sensi_{green}(\lambda) \cdot Illum(\lambda) \cdot Optics(\lambda) \cdot Reflec(\lambda) d\lambda$$

$$B = \int_{\lambda-visual} Sensi_{blue}(\lambda) \cdot Illum(\lambda) \cdot Optics(\lambda) \cdot Reflec(\lambda) d\lambda$$

The system spectral product (SSP($\lambda$)) of a capture system is defined as:

$$SSP(\lambda) = Sensi(\lambda) \cdot Illum(\lambda) \cdot Optics(\lambda) \quad \text{(Eq. 2)}$$

Where Sensi($\lambda$) represents $Sensi_{red}(\lambda)$, $Sensi_{green}(\lambda)$, or $Sensi_{blue}(\lambda)$.

Generally, the red, green and blue system spectral product curves of an electronic camera are designed in such way that each one of them can be written as some linear combination of the three curves that describe the color matching functions of a display monitor. For instance, U.S. Pat. No. 5,668,596, "Digital Imaging Device Optimized for Color Performance", which is incorporated herein by reference, demonstrates the use of a correction matrix on such a video imaging system and discusses a method for minimization of the error between the set of spectral sensitivities of an imaging device, including its optical section, and the color sensitivities of the output device. This design allows a matrix (linear) operation, which is usually referred to as a color-correction matrix (CCM), to transform the "electronic camera exposure space" into the "display monitor exposure space". This transformation is equivalent to an adjustment of the capture system spectral product curves, as described by the following equation:

$$\begin{bmatrix} CCD_R(\lambda_1) & CCD_G(\lambda_1) & CCD_B(\lambda_1) \\ CCD_R(\lambda_2) & CCD_G(\lambda_2) & CCD_B(\lambda_2) \\ \vdots & \vdots & \vdots \\ CCD_R(\lambda_n) & CCD_G(\lambda_n) & CCD_B(\lambda_n) \end{bmatrix}_{n \times 3} \quad \text{Equation 3}$$

$$\begin{bmatrix} ccm_{1,1} & ccm_{1,2} & ccm_{1,3} \\ ccm_{2,1} & ccm_{2,2} & ccm_{2,3} \\ ccm_{3,1} & ccm_{3,2} & ccm_{3,3} \end{bmatrix}_{3 \times 3} =$$

$$\begin{bmatrix} Mon_R(\lambda_1) & Mon_G(\lambda_1) & Mon_B(\lambda_1) \\ Mon_R(\lambda_2) & Mon_G(\lambda_2) & Mon_B(\lambda_2) \\ \vdots & \vdots & \vdots \\ Mon_R(\lambda_n) & Mon_G(\lambda_n) & Mon_B(\lambda_n) \end{bmatrix}_{n \times 3}$$

where the first matrix on the left of Equation 3 represents the three system spectral product curves of the electronic capture device and the matrix on the right side of Equation 3 represents the color matching functions of a display monitor. Equation 3 holds true under the assumption that a linear relationship exists between the electronic capture system spectral product curves and the display monitor color matching functions. If that is not the case, the CCM can only offer an approximation. The advantage of using matrix operations is that they are inexpensive and also simpler than, e.g. look-up tables, to implement in hardware, as described in U.S. Pat. No. 5,001,663; "Programmable Digital Circuit for Performing a Matrix Multiplication", which is incorporated herein by reference. U.S. Pat. No. 5,668,596, thus represents a commonly used matrixing method based on the development of a color-correction-matrix (CCM) that adapts a video capture system, uniquely determined by its system spectral product curves, for a display device. An improvement on this method is shown in U.S. Pat. No. 5,805,213, "Method and Apparatus for Color-Correcting Multi-Channel Signals of a Digital Camera", which is incorporated herein be reference, where a CCM is developed (for a video device) such that it is capable of adjusting for changes in lighting (illuminant) conditions. The coefficients of the CCM are computed as functions of the illuminant of the scene, in the image processing chain of the apparatus, instead of being constant for every lighting set-up. Nonetheless, in both of these patents, since the electronic camera system spectral product curves of a CCD sensor cannot be described as linear combinations of film system spectral product curves, the aforementioned matrices will not provide a perfect match between a set of CCD exposures and a set of film system exposures. Consequently, only an approximation in exposures is offered by these methods, as opposed to a match between corrected video and telecine-transferred film.

Figure 2:
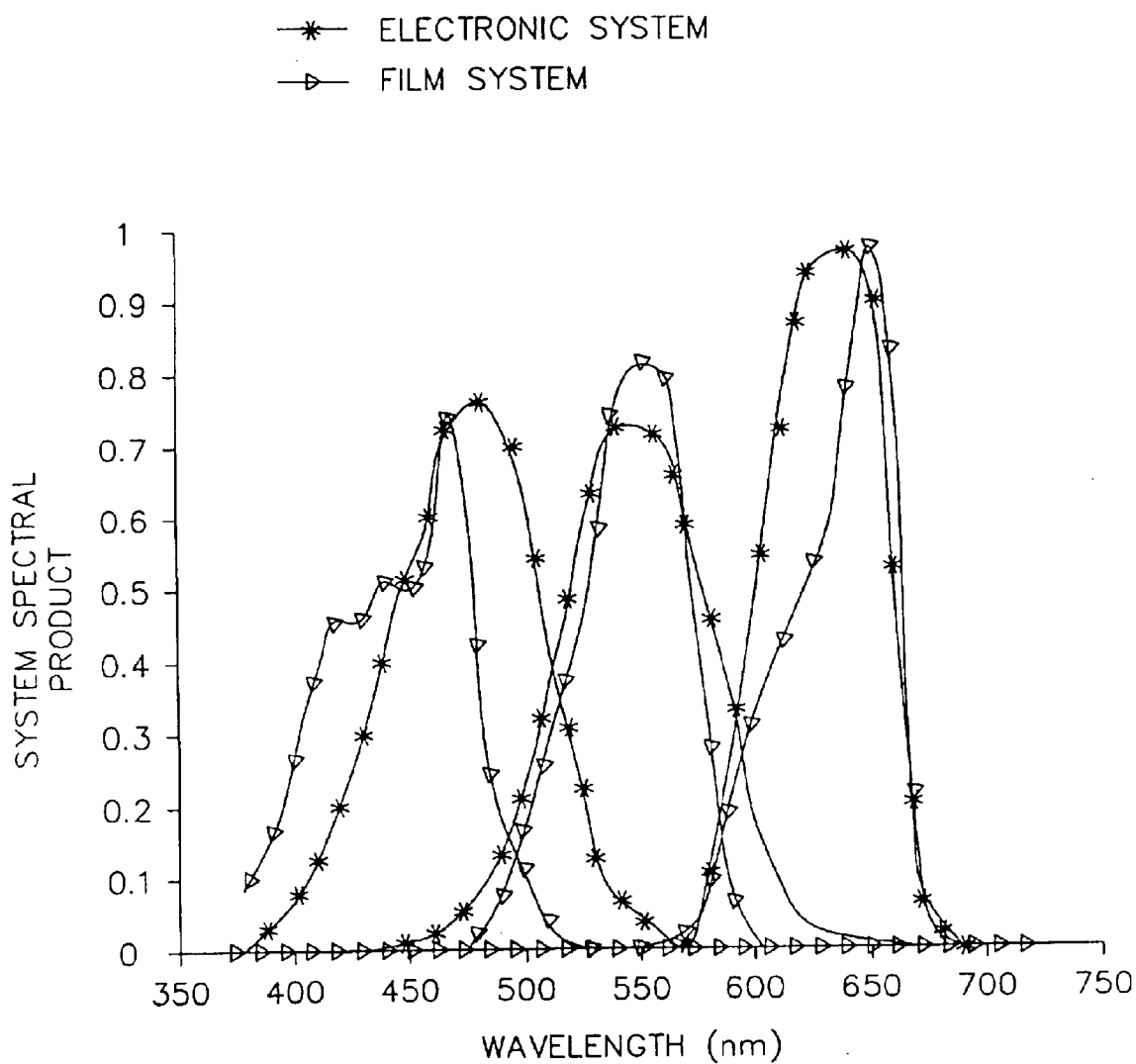
FIG. 2 illustrates two sets of system spectral product curves, the first set corresponding to a known electronic capture device and the second set corresponding to a known film system.
Figure 3:
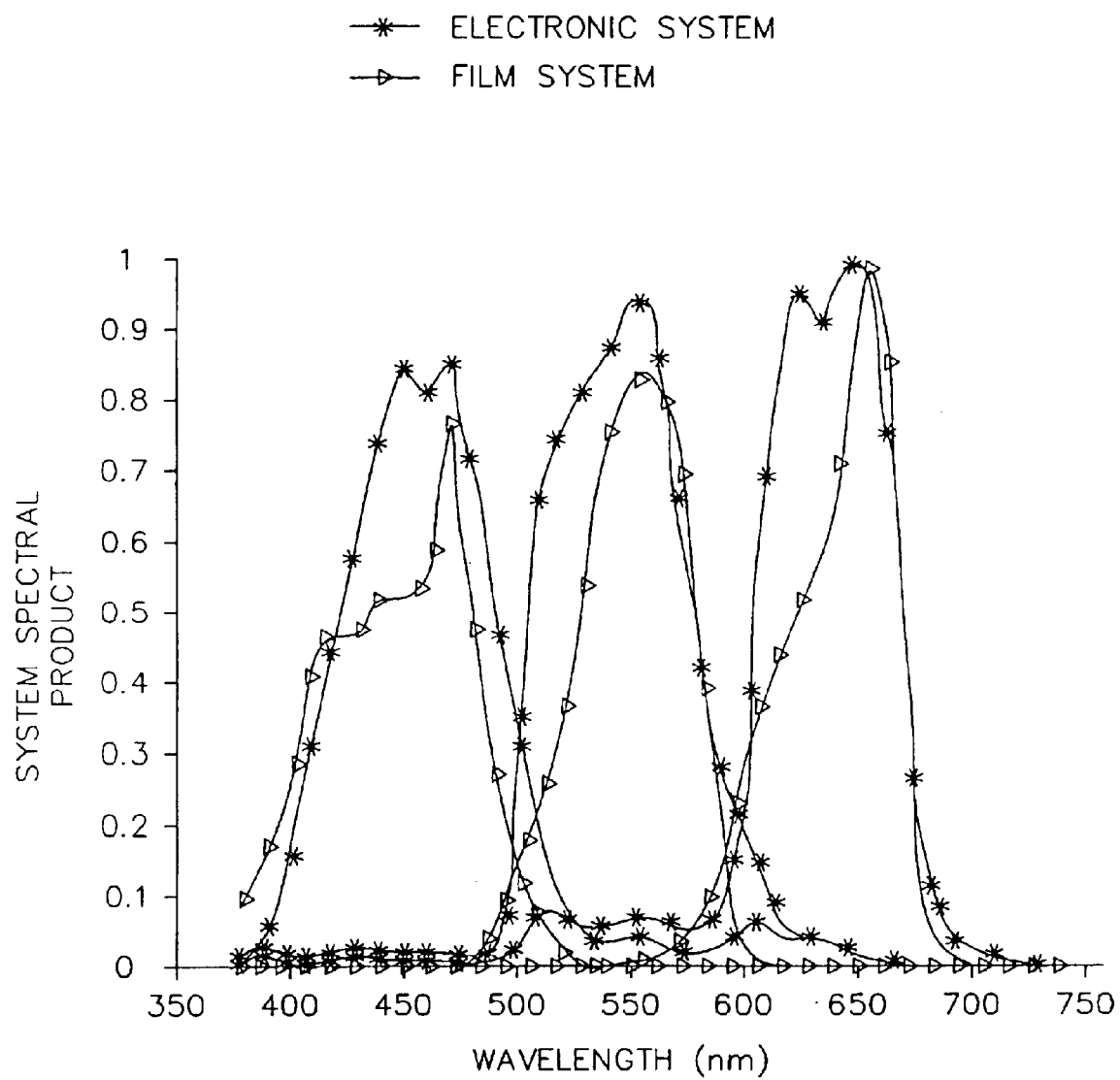
FIG. 3 illustrates two sets of system spectral product curves, the first set corresponding to curves provided by the electronic system according to the invention and the second set corresponding to a known film system.

Electronic system spectral product curves according to the invention are designed considering the film system spectral product curves. In particular, the electronic camera system spectral curves can be approximated by a linear combination of the film system spectral curves. The traditional approach taken by the prior art is to model electronic capture system spectral product curves based on color matching curves of a display device (a cathode-ray-tube device, for example), as indicated in the aforementioned U.S. Pat. No. 5,668,596. FIG. 2 shows a comparison between typical film system spectral product curves and system spectral product curves from a typical electronic camera developed by a well-known manufacturer of electronic devices. In this specific example, the system spectral product curves are from the Kodak Megaplus ES 1.0 digital camera, using tungsten 3200° K. illumination and the film system spectral product curves are for the Kodak Vision 500T Color Negative Film, using the same illumination conditions. It can be determined that one set cannot be described as a linear combination of the other. The goal thus is to arrive at sets of system curves that meet this criteria. One way of doing this is to derive a set of "additional" spectral product curves that will, when combined with the CCD spectral product curves of an available camera, produce a set of "composite" electronic system spectral product curves that can be described as a linear combination of the film system spectral product curves. Such a result is shown in FIG. 3, which compares the same set of film system spectral product curves to a particular set of curves (the "electronic system spectral product curves") which can be approximated by a linear combination of the film curves.

While different design approaches may be taken to obtain these desired electronic system spectral product curves, one approach is to start with a camera having system curves that are as close as possible to the film system curves. The aforementioned ES 1.0 is just such a camera. Then, a filter may be designed with a transmittance curve that meets certain design criteria, as follows:

Let the areas under the red, green and blue curves for the film system be $F_r$, $F_g$ and $F_b$.

Let the areas under the red, green, and blue curves for the chosen electronic system be $E_r$, $E_g$ and $E_b$.

Then a filter is designed such that the following holds true:

$$(F_r/F_g)=(E_r/E_g) \text{ AND } (F_r/F_b)=(E_r/E_b)$$

The product of the spectral curves of this filter and the CCD spectral product curves of an available CCD camera, e.g., the ES 1.0 camera, produces electronic system spectral product curves of the type shown in FIG. 3. This design allows a matrix (linear) operation to transform the "electronic system exposure space" into the "film system exposure space". This transformation is equivalent to an adjustment of the electronic system spectral product curves, as described by the following equation:

$$\begin{bmatrix} SYS_R(\lambda_1) & SYS_G(\lambda_1) & SYS_B(\lambda_1) \\ SYS_R(\lambda_2) & SYS_G(\lambda_2) & SYS_B(\lambda_2) \\ \vdots & \vdots & \vdots \\ SYS_R(\lambda_n) & SYS_G(\lambda_n) & SYS_B(\lambda_n) \end{bmatrix}_{n \times 3} \quad \text{(Eq. 4)}$$

$$\begin{bmatrix} ccm_{1,1} & ccm_{1,2} & ccm_{1,3} \\ ccm_{2,1} & ccm_{2,2} & ccm_{2,3} \\ ccm_{3,1} & ccm_{3,2} & ccm_{3,3} \end{bmatrix}_{3 \times 3} =$$

$$\begin{bmatrix} Flm_R(\lambda_1) & Flm_G(\lambda_1) & Flm_B(\lambda_1) \\ Flm_R(\lambda_2) & Flm_G(\lambda_2) & Flm_B(\lambda_2) \\ \vdots & \vdots & \vdots \\ Flm_R(\lambda_n) & Flm_G(\lambda_n) & Flm_B(\lambda_n) \end{bmatrix}_{n \times 3}$$

where the first matrix on the left of equation 4 represents the electronic system spectral product curves, and the matrix on the right side of equation 4 represents the film system spectral product curves. Since the film system spectral product curves are known (for a given film), and the electronic system spectral product curves can be determined as described above(for a given camera), the values for the CCM matrix can be computed from a regression between the two sets of curves. As can be appreciated by comparing equation 4 with equation 3, the first matrix on the left of equation 4 is comparable to having a CCD or like sensor with electronic system spectral product curves of the type disclosed in connection with the present invention. While this is not the current practice, one could imagine custom sensors manufactured just for this purpose, and the appended claims are intended to cover such an eventuality.

Exposures yielded from a capture sub-system based on such a particular set of electronic system spectral product curves according to the invention are different than those obtained from film systems. However, these exposures can be processed to represent film system exposures with significantly less error than those obtained from current prior art CCD capture devices. The preferred embodiment of the invention, as shown in FIG. 1, provides this particular set of electronic system spectral product curves for the capture sub-system by optically filtering the CCD sensor 16 with the filter 24 (or 24'), which provides the aforementioned filter spectral product curves. Since there are a very large number of capture devices and film stocks that may be used in practicing the invention, thus requiring a equivalently large number of different curve combinations, the particular set of curves will be left to the skilled person to calculate, based upon the aforementioned procedure. Given this procedure, one of ordinary skill can devise a suitable CCM matrix that will transform the "electronic system exposure space" into the "film system exposure space". This matrix is then tested in an iterative procedure, as will be described, to determine its best fit to certain parameters.

Figure 4:
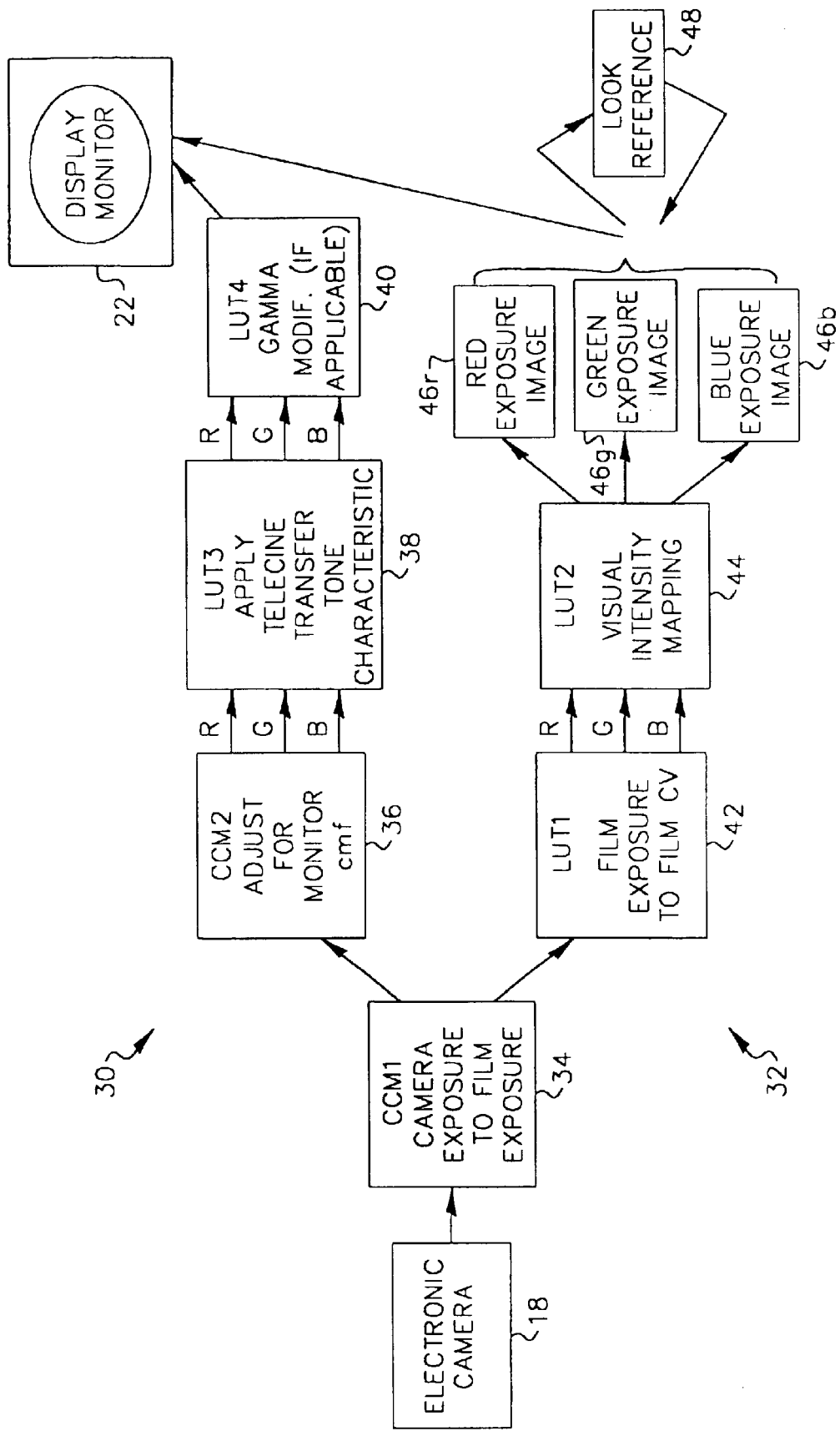
FIG. 4 illustrates two paths provided by the image processing chain of the invention, including one path corresponding to the functionality of the invention that emulates a spatial light meter and the other path corresponding to the functionality of the invention that emulates the "telecine look".

FIG. 4 shows detail of the image processing chain of the invention. Furthermore, the preferred embodiment is capable of performing in two basic modes, as described by separate processing paths 30 and 32 in the detailed block diagram in FIG. 4. Mode 1 (path 30) provides the user with an accurate visual prediction of the appearance of a scene after it is captured onto a film stock and undergoes a telecine transfer, being further broadcast displayed. Mode 2 (path 32) provides the user with the red, green and blue exposure contents of a scene, according to the spectral product curves of the film system on which it is supposed to be captured. In both modes, a color correction matrix 34 (CCM1) converts exposure signals from the electronic camera 18 into equivalent film system exposure signals, and the display monitor 22 displays the signals resulting from each path.

When the processing system is set to Mode 1 (path 30), the functionality performed comprises emulating the look of scenes captured on traditional film, telecine-transferred to video format and further displayed on a broadcast monitor. After light reflected from the scene is captured in the electronic camera 18 and the correspondent R, G, B signals are sent to the image processing unit 26, the following basic image processing operations are performed:

The color correction matrix 34 (CCM1) converts electronic camera exposure signals into equivalent film system exposure signals.

A second color correction matrix 36 (CCM2) transforms film system exposure signals into monitor exposure signals, according to the color matching functions of the display monitor 22.

Three 1-D look-up tables 38 (LUT3) apply film telecine transfer tone scale characteristics to the signals resulting from the product of the film system exposure signal matrix 34 and the second color correction matrix 36 (CCM2).

Three 1-D look-up tables 40 (LUT4) compensate for the transfer (gamma) function of the display monitor 22, if necessary.

The output image is then viewed on the display monitor 22.

The performance of the system spectral product curves pertinent to the invention can be assessed by determining the value of two parameters. The input data used for these tests consists of a diagnostic set of 190 color patches, defined by spectral reflectance curves, as given in U.S. Pat. No. 5,582,961, "Photographic Elements Which Achieve Colorimetrically Accurate Recording", which is incorporated herein by reference. These test colors consist of 190 entries of known spectral reflectance specified at 10 nm increments, and are reproduced in the Appendix of the '961 patent.

The first parameter is defined by the following equation:

$$VarE_k = \max\left|\frac{1}{0.3}\log\left(\frac{(ME)_{D,k}}{E_{F,k}}\right)\right| \qquad \text{(Eq. 5)}$$

Where $VarE_k$ is the maximum variation (difference), in stops, between exposure values yielded from an electronic image capture device matrixed for conversion to film system exposure space $((ME)_{D,k})$ and exposure values, computed for the same object, yielded from a film system $(E_{F,k})$. The subscript k represents any of the R, G, and B channels.

The second parameter, the Noise-Gain Factor ($\Psi$), is calculated according to the following equation:

$$\Psi = \sum_j \sqrt{\sum_i m_{ij}^2} \qquad \text{(Eq. 6)}$$

Where $m_{ij}$ is the element on the i-th row and j-th column of the matrix M used to transform a "electronic camera exposure space" into a "film system exposure space". The importance of the Noise-Gain Factor in imaging systems has been recognized and described in the aforementioned U.S. Pat. No. 5,582,961.

Combined, these two parameters allow for a useful assessment of the performance capabilities of any electronic image capture system intended to emulate film systems. The first parameter measures how "close" the exposures resultant from an electronic image capture device are to the exposures resultant from film. It is a well-known fact by those skilled-in-the-art that careful consideration must be given to the trade-off between applying large correction (as indicated by the magnitude of a matrix off-diagonal terms) to achieve a desired level of color accuracy at the expense of introducing noise (another source of image degradation). The Noise-Gain Factor, therefore, serves as a metric to indicate how much noise is being introduced in the reproduction by the non-diagonal terms of the matrix that takes electronic camera system exposures into film system exposures. Low noise systems have low Noise-Gain Factors. This assessment is based on the following test:

A set of exposure values, $E_{D,k}$, is calculated from the spectral reflectance curves of the 190 patches from the diagnostic set described in the aforementioned '961 patent and the electronic camera system spectral product curves, using an appropriate illuminant.

This set of exposure values is multiplied by the matrix M, responsible for taking electronic image capture exposure space into film system exposure space. This matrix multiplication results in a modified exposure set, $(ME)_{D,k}$.

A second set of exposure values, $E_{F,k}$ is calculated based on the spectral reflectance curves of the 190 patches from the diagnostic set described in the aforementioned '961 patent and a conventional motion picture film system spectral product.

These two sets of exposures, $(ME)_{D,k}$ and $E_{F,k}$ are used to determine the values of $VarE_R$, $VarE_G$, and $VarE_B$, for each of the 190 patches.

Also, the value of ($\Psi$) is determined from the elements of the matrix M, according to Equation 5.

The values of $VarE_R$, $VarE_G$, $VarE_B$, and ($\Psi$) were calculated for a variety of commercially available electronic image capture systems, as shown in Table 1:

TABLE 1

| Entry | Device | $VarE_R$ | $VarE_G$ | $VarE_B$ | ($\Psi$) |
|---|---|---|---|---|---|
| 1 | Device #1 | 0.76 | 3.08 | 1.21 | 4.60 |
| 2 | Device #2 | 0.36 | 4.65 | 4.26 | 6.14 |
| 3 | Device #3 | 0.40 | 6.00 | 3.42 | 6.07 |
| 4 | Device #4 | 0.33 | 2.55 | 1.88 | 3.50 |
| 5 | Device #5 | 0.53 | 4.61 | 2.13 | 3.87 |

A commercially available device was spectrally filtered in order to produce the system spectral product curves that meet the criteria specified in this invention. The values of $VarE_R$, $VarE_G$, $VarE_B$, and ($\Psi$) were calculated for this device and are shown in Table 2:

TABLE 2

| Device | $VarE_R$ | $VarE_G$ | $VarE_B$ | ($\Psi$) |
|---|---|---|---|---|
| Filtered Device | 0.20 | 0.50 | 0.53 | 3.27 |

From results shown in Table 1 and Table 2, it is determined that an electronic capture system functions satisfactorily according to the invention if $VarE_k<0.55$ and $\Psi \leq 3.45$.

The functionality performed when the system is set to Mode 2 (path 32) comprises displaying, on the computer monitor 22, the red, green and blue exposure content of a scene. After light reflected from the scene is captured on the electronic camera 18 and the correspondent R, G, B signals are sent to the image processing unit 26, the following basic image processing operations are performed:

The color correction matrix 34 (CCM1) converts electronic camera exposure signals into equivalent film system exposure signals.

Equal increments of film system exposure signals are mapped onto film code values by a 1-D LUT 42(LUT1).

A 1-D LUT 44 (LUT2) maps film code values to monitor code values. This LUT 44 is designed such that the visual intensity difference between areas on the reproduction of a scene is proportional to the ratio of the exposure level of those areas as "seen" by the film system.

Three monochromatic images 46r, 46g, 46b are generated on the display monitor 22. Each image displays the exposure content of one of the three channels (R, G, B).

Adjustments are made in the image processing unit 26 to the gain of the electronic camera in order to establish (in a reference stage 48) a triplet of code values which define a point of normal (reference) exposure.

In this manner, therefore, the user is presented with the red, green and blue exposure contents of a scene, according to the spectral product curves of the film system on which it is supposed to be captured.

In summary, the invention comprises a real-time electronic motion camera system. This system is capable of emulating the look of a motion picture film which has been transferred into video format by a telecine device and broadcast displayed. The system is also capable of providing video output of the red, green and red exposure content of a scene as captured by a traditional motion picture camera and film system. The invention comprises an electronic camera, a host computer and an output display device. The system spectral product curves for the invention can be approximately described as linear combinations of traditional motion picture camera and film system product curves, which allows for significant reduction in differences between exposures yielded from these two distinct capture systems. This particular design of system spectral product, in conjunction with the elements in the processing chain of the invention, allows for increase in processing speed and output accuracy of the emulation of telecine-transferred scenes, which cannot be achieved by current art. It also provides the invention with the capability of acting as a spatial light meter, capturing the exposure content of a scene in the same fashion as film.

The invention has been described with reference to a preferred embodiment. However, it will be appreciated that variations and modifications can be effected by a person of ordinary skill in the art without departing from the scope of the invention.

PARTS LIST 10 light source
12 objects
14 optical section
16 sensor(s)
18 electronic camera
20 host computer
22 display monitor
24 filter
26 image processing unit
30 processing path
32 processing path
34 color correction matrix (CCM1)
36 second color correction matrix (CCM2)
38 1-D look up tables (LUT3)
40 1-D look up tables (LUT4)
42 1-D look up tables (LUT1)
44 1-D look up tables (LUT2)
46 r,g,b monochromatic images
48 reference stage

What is claimed is:

1. A method for converting an electronically originated image into a modified electronic image simulating an image originated from a film system and converted into an electronically displayed image, said method comprising the steps of:

providing a set of electronic camera system spectral product curves that are substantially approximated by a linear combination of a set of spectral product curves characteristic of the film system and that are independent of calibration procedures associated with image capture;

capturing an image having red, green and blue exposure signals resulting from the electronic camera system spectral product curves; and converting the red, green and blue exposure signals into a modified electronic image simulating an image originated from a film system and converted into an electronically displayed image.

2. The method as claimed in claim 1 further including an image sensor having a set of image sensor spectral product curves, and wherein the step of providing a set of electronic camera system spectral product curves comprises modifying the set of image sensor spectral product curves by positioning one or more optical filters in front of the image sensor during the capture of the image.

3. The method as claimed in claim 1 further including an image sensor having a set of image sensor spectral product curves, and wherein the step of providing a set of electronic camera system spectral product curves comprises providing the image sensor with a color filter array that provides the set of electronic camera system spectral product curves.

4. The method as claimed in claim 1 wherein the step of converting the red, green and blue exposure signals comprises the steps of:

converting the exposure signals into equivalent film system exposure signals;

transforming the equivalent film system exposure signals into monitor exposure signals, according to the color matching functions of a display device;

applying film telecine transfer tone scale characteristics to the monitor exposure signals; and compensating the monitor exposure signals for the transfer characteristic of the display device.

5. The method as claimed in claim 4 wherein the step of converting the exposure signals into equivalent film system exposure signals is performed by application of a matrix.

6. The method as claimed in claim 4 wherein the step of transforming the equivalent film system exposure signals into monitor exposure signals is performed by application of a matrix.

7. The method as claimed in claim 4 wherein the step of applying film telecine transfer tone scale characteristics to the monitor exposure signals is performed by application of one or more look up tables.

8. The method as claimed in claim 4 further comprising the step of displaying the compensated monitor exposure signals on the display monitor.

9. The method as claimed in claim 4 wherein the step of compensating for the transfer function of a display monitor is performed by one or more look up tables.

10. The method as claimed in claim 1 wherein the degree of approximation between the set of electronic camera system spectral product curves and the linear combination of a set of spectral product curves characteristic of the film system is determined by measuring (a) a maximum variation, in exposure stops, between exposure values captured as electronically originated images and converted into equivalent film system exposure signals and exposure values yielded from the film system and (b) a noise-gain factor of a matrix used to convert the electronically originated images into equivalent film system exposure signals.

11. A method employing an electronic capture system for converting an electronically originated image of a scene into a set of modified electronic images simulating monochromatic red, green and blue exposures originated from a film system and converted into an electronically displayed image, said method comprising the steps of:

providing a set of electronic camera system spectral product curves that are substantially approximated by a linear combination of a set of spectral product curves characteristic of the film system . . . and that are independent of calibration procedures associated with image capture;

capturing an image having red, green and blue exposure signals resulting from the electronic camera system spectral product curves;

converting the exposure signals into equivalent film system exposure signals;

mapping equal increments of film system exposure signals onto film code values;

mapping the film code values to monitor code values in order that visual intensity differences between areas on the reproduction of a scene are proportional to the ratio of the exposure level of those areas as seen by the film system;

generating three monochromatic images, each monochromatic image revealing the exposure content of one of the three color channels; and displaying one or more of the three monochromatic images in order to evaluate the exposure content of the scene.

12. The method as claimed in claim 11 further comprising the step of adjusting the gain of the electronic capture system in order to define a triplet of code values that define a point of normal (reference) exposure.

13. A camera system for converting an electronically originated image into a modified electronic image simulating an image originated from a film system and converted into an electronically displayed image, said system comprising:

an electronic camera for capturing an image and generating red, green and blue exposure signals, said electronic camera including an electronic capture device providing a set of electronic camera system spectral product curves that are substantially approximated by a linear combination of a set of spectral product curves characteristic of the film system, and that are independent of calibration procedures associated with image capture; and a processing stage for converting the red, green and blue exposure signals into a modified electronic image simulating an image originated from a film system and converted into an electronically displayed image.

14. The system as claimed in claim 13 wherein the electronic camera system spectral product curves are provided by modifying a set of electronic capture device spectral product curves by one or more optical filters that are used in capturing the image.

15. The system as claimed in claim 13 wherein the electronic camera system spectral product curves are provided by a color filter array on the capture device that provides the set of electronic camera system spectral product curves.

16. The system as claimed in claim 13 wherein the processing stage converts the exposure signals into equivalent film system exposure signals through a matrix operation.

17. An electronic camera for capturing an image and generating red, green and blue exposure signals, said electronic camera comprising an electronic capture device providing a set of electronic camera system spectral product curves that are substantially approximated by a linear combination of a set of spectral product curves characteristic of a film system, and that are independent of calibration procedures associated with image capture.

18. The camera as claimed in claim 17 wherein the electronic camera system spectral product curves are provided by modifying a set of electronic capture device spectral product curves by one or more optical filters that are used in capturing the image.

19. The system as claimed in claim 17 wherein the electronic camera system spectral product curves are provided by a color filter array on the capture device that provides the set of electronic camera system spectral product curves.

20. An optical filter providing a spectral transmittance curve shape that, when combined with the spectral product curves of an electronic capture device, provides a set of spectral product curves that are substantially approximated by a linear combination of a set of spectral product curves characteristic of a film system, and that are independent of calibration procedures associated with image capture.

21. A method for capturing an electronically originated image in a form that can be converted into a modified electronic image simulating an image originated from a film system, said method comprising the steps of:

providing a set of electronic camera system spectral product curves that are substantially approximated by a linear combination of a set of spectral product curves characteristic of the film system, and that are independent of calibration procedures associated with image capture; and capturing an image having red, green and blue exposure signals resulting from the electronic camera system spectral product curves.

22. The method as claimed in claim 21 for converting the electronically originated image into a modified electronic image simulating an image originated from a film system, said method comprising the further step of converting the red, green and blue exposure signals into a modified electronic image simulating an image originated from a film system.

23. The method as claimed in claim 22 wherein the matrix operation.

* * * * *

UNITED STATES PATENT AND TRADEMARK OFFICE
CERTIFICATE OF CORRECTION

PATENT NO. : 6,864,915 B1
DATED : March 8, 2005
INVENTOR(S) : Marcelo de C. Guimaraes et al.

It is certified that error appears in the above-identified patent and that said Letters Patent is hereby corrected as shown below:

<u>Title page,</u>
Item [75], Inventors, third inventor should read -- Nestor M. Rodriguez --

Signed and Sealed this

Twenty-fourth Day of May, 2005

JON W. DUDAS
*Director of the United States Patent and Trademark Office*